United States Patent
Killilea et al.

(10) Patent No.: US 8,658,286 B2
(45) Date of Patent: *Feb. 25, 2014

(54) HIGH PERFORMANCE AQUEOUS COATING COMPOSITIONS

(75) Inventors: T. Howard Killilea, North Oaks, MN (US); Michael C. Wildman, Hoffman Estates, IL (US); Bruce A. Johnson, Crystal Lake, IL (US); Carl H. Weber, Cary, IL (US)

(73) Assignee: Valspar Sourcing, Inc., Minneapolis, MN (US)

( * ) Notice: Subject to any disclaimer, the term of this patent is extended or adjusted under 35 U.S.C. 154(b) by 92 days.

This patent is subject to a terminal disclaimer.

(21) Appl. No.: 12/905,815

(22) Filed: Oct. 15, 2010

(65) Prior Publication Data

US 2011/0033709 A1 Feb. 10, 2011

Related U.S. Application Data

(62) Division of application No. 11/757,916, filed on Jun. 4, 2007, now Pat. No. 7,834,086.

(60) Provisional application No. 60/810,739, filed on Jun. 2, 2006.

(51) Int. Cl.
*B32B 27/06* (2006.01)
*B05D 1/00* (2006.01)

(52) U.S. Cl.
USPC ........... 428/500; 428/447; 428/413; 427/387; 524/560; 524/504; 524/523; 524/458

(58) Field of Classification Search
USPC .......... 524/504, 560, 523, 458; 428/500, 447, 428/413; 427/387
See application file for complete search history.

(56) References Cited

U.S. PATENT DOCUMENTS

| 2,128,961 A | 9/1938 | Patterson |
| 2,356,542 A | 8/1944 | Sloan |
| 2,633,458 A | 3/1953 | Shokal |
| 2,674,775 A | 4/1954 | Willson |
| 2,727,012 A | 12/1955 | Treat et al. |
| 2,730,517 A | 1/1956 | Vogel et al. |

(Continued)

FOREIGN PATENT DOCUMENTS

| AU | 198060655 A1 | 3/1981 |
| AU | 2005100347 B4 | 5/2005 |

(Continued)

OTHER PUBLICATIONS

Koleske et al., *Two Thousand Three Additives Guide*, Paint and Coatings Industry, pp. 1-76 (Apr. 2003).

(Continued)

*Primary Examiner* — Satya Sastri
(74) *Attorney, Agent, or Firm* — IPLM Group, P.A.

(57) ABSTRACT

This invention relates to coating compositions that include water; a latex polymer and a silane coupling agent. The latex polymer preferably comprises acetoacetoxy functionality, or is a multistage latex, or is an acetoacetoxy functional multistage latex. The silane coupling agent is preferably a functionalized silane coupling agent (more preferably an epoxy-functional silane coupling agent). The compositions may be used to coat a variety of substrates, including wood, cement and fiber cement. Articles having the coating applied thereto are also provided.

15 Claims, 4 Drawing Sheets

(56) References Cited

U.S. PATENT DOCUMENTS

| | | |
|---|---|---|
| 3,010,919 A | 11/1961 | MacKinney et al. |
| 3,049,458 A | 8/1962 | Willard |
| 3,091,551 A | 5/1963 | Robertson |
| 3,219,467 A | 11/1965 | Redican et al. |
| 3,380,831 A | 4/1968 | Cohen et al. |
| 3,449,161 A | 6/1969 | Hindersinn et al. |
| 3,481,894 A | 12/1969 | Lima et al. |
| 3,655,423 A | 4/1972 | Lin et al. |
| 3,781,396 A | 12/1973 | Okuda et al. |
| 3,804,735 A | 4/1974 | Radlove et al. |
| 3,899,611 A | 8/1975 | Hall |
| 3,935,173 A | 1/1976 | Ogasawara et al. |
| 3,935,364 A | 1/1976 | Prokesh et al. |
| 3,952,032 A | 4/1976 | Vrancken et al. |
| 3,970,628 A | 7/1976 | Connelly et al. |
| 3,986,996 A | 10/1976 | Villa et al. |
| 3,991,136 A | 11/1976 | Dalton et al. |
| 4,015,040 A | 3/1977 | Hoshida et al. |
| 4,028,294 A | 6/1977 | Brown et al. |
| 4,113,893 A | 9/1978 | Hahn |
| 4,132,526 A | 1/1979 | Schwarz et al. |
| 4,197,389 A | 4/1980 | Becker et al. |
| 4,211,848 A | 7/1980 | Blount |
| 4,228,761 A | 10/1980 | Glover et al. |
| 4,324,822 A | 4/1982 | Kobayashi et al. |
| 4,333,867 A | 6/1982 | Sauntson |
| 4,385,152 A | 5/1983 | Boyack et al. |
| 4,390,688 A | 6/1983 | Walz et al. |
| 4,408,018 A | 10/1983 | Bartman et al. |
| 4,486,553 A | 12/1984 | Wesch |
| 4,522,962 A | 6/1985 | Abbey et al. |
| 4,528,307 A | 7/1985 | Fuhr et al. |
| 4,536,534 A | 8/1985 | Singer et al. |
| 4,582,755 A | 4/1986 | Dietrich |
| 4,598,108 A | 7/1986 | Hoefs |
| 4,719,149 A | 1/1988 | Aasen et al. |
| 4,737,577 A | 4/1988 | Brown |
| 4,742,121 A | 5/1988 | Toman |
| 4,782,109 A | 11/1988 | DuLaney et al. |
| 4,822,828 A | 4/1989 | Swofford |
| 4,822,858 A | 4/1989 | Pivotto et al. |
| 4,852,316 A | 8/1989 | Webb |
| 4,880,660 A | 11/1989 | Aasen et al. |
| 4,886,852 A | 12/1989 | Numa |
| 4,904,522 A | 2/1990 | Markusch |
| 4,908,229 A | 3/1990 | Kissel |
| 4,916,004 A | 4/1990 | Ensminger et al. |
| 5,017,632 A | 5/1991 | Bredow et al. |
| 5,073,578 A | 12/1991 | Boodaghains et al. |
| 5,075,370 A | 12/1991 | Kubitza et al. |
| 5,100,948 A | 3/1992 | Aydin et al. |
| 5,157,074 A | 10/1992 | Metzger et al. |
| 5,191,012 A | 3/1993 | Markusch et al. |
| 5,212,230 A | 5/1993 | Tirpak et al. |
| 5,221,710 A | 6/1993 | Markusch et al. |
| 5,236,994 A | 8/1993 | Markusch et al. |
| 5,262,444 A | 11/1993 | Rusincovitch et al. |
| 5,296,530 A | 3/1994 | Bors et al. |
| 5,356,716 A | 10/1994 | Patel |
| 5,371,148 A | 12/1994 | Taylor et al. |
| 5,407,783 A | 4/1995 | Caruso |
| 5,409,984 A | 4/1995 | Gerhardinger et al. |
| 5,418,264 A | 5/1995 | Obloh et al. |
| 5,426,142 A | 6/1995 | Rosano et al. |
| 5,461,125 A | 10/1995 | Lu et al. |
| 5,468,804 A | 11/1995 | Schmalstieg et al. |
| 5,478,601 A | 12/1995 | Larson et al. |
| 5,484,849 A | 1/1996 | Bors et al. |
| 5,500,457 A | 3/1996 | Sarkar et al. |
| 5,534,310 A | 7/1996 | Rokoski et al. |
| 5,559,192 A | 9/1996 | Bors et al. |
| 5,562,953 A | 10/1996 | Bors et al. |
| 5,567,767 A | 10/1996 | Smeal et al. |
| 5,569,686 A | 10/1996 | Makati et al. |
| 5,571,863 A | 11/1996 | Smeal et al. |
| 5,672,379 A | 9/1997 | Schall et al. |
| 5,679,721 A | 10/1997 | Courtoy et al. |
| 5,681,385 A | 10/1997 | Beckenhauer |
| 5,688,867 A | 11/1997 | Scheibelhoffer et al. |
| 5,708,077 A | 1/1998 | Nölken et al. |
| 5,708,093 A | 1/1998 | Bastelberger et al. |
| 5,718,943 A | 2/1998 | Hsu et al. |
| 5,766,768 A | 6/1998 | Cummings et al. |
| 5,777,053 A | 7/1998 | McBain et al. |
| 5,780,117 A | 7/1998 | Swartz et al. |
| 5,798,426 A | 8/1998 | Anton et al. |
| 5,814,397 A | 9/1998 | Cagliostro et al. |
| 5,869,590 A | 2/1999 | Clark et al. |
| 5,874,503 A | 2/1999 | Scheibelhoffer et al. |
| 5,928,778 A | 7/1999 | Takahashi et al. |
| 5,945,044 A | 8/1999 | Kawai et al. |
| 5,962,571 A | 10/1999 | Overbeck et al. |
| 5,973,068 A | 10/1999 | Yamaya et al. |
| 5,994,428 A | 11/1999 | Lutz et al. |
| 5,997,952 A | 12/1999 | Harris et al. |
| 6,007,619 A | 12/1999 | Laas et al. |
| 6,008,289 A | 12/1999 | König et al. |
| 6,011,078 A | 1/2000 | Reich et al. |
| 6,028,155 A | 2/2000 | Collins et al. |
| 6,030,447 A | 2/2000 | Naji et al. |
| 6,045,871 A | 4/2000 | Matt et al. |
| 6,045,873 A | 4/2000 | Adachi et al. |
| 6,048,471 A | 4/2000 | Henry |
| 6,063,864 A | 5/2000 | Mathur et al. |
| 6,103,352 A | 8/2000 | Takahashi |
| 6,114,440 A | 9/2000 | Yamaya et al. |
| 6,136,383 A | 10/2000 | Schwartz et al. |
| 6,146,710 A | 11/2000 | Symons |
| 6,162,511 A | 12/2000 | Garnett et al. |
| 6,235,228 B1 | 5/2001 | Nicholl et al. |
| 6,297,320 B1 | 10/2001 | Tang et al. |
| 6,346,146 B1 | 2/2002 | Duselis et al. |
| 6,395,827 B1 | 5/2002 | Pears et al. |
| 6,398,976 B1 | 6/2002 | Sandoval et al. |
| 6,417,267 B1 | 7/2002 | Stockl et al. |
| 6,426,414 B1 | 7/2002 | Laas et al. |
| 6,453,960 B1 | 9/2002 | Kondo et al. |
| 6,458,250 B1 | 10/2002 | Holliday et al. |
| 6,475,556 B1 | 11/2002 | Sobczak et al. |
| 6,485,601 B1 | 11/2002 | Egan et al. |
| 6,485,793 B1 | 11/2002 | Ott et al. |
| 6,492,450 B1 | 12/2002 | Hsu |
| 6,506,248 B1 | 1/2003 | Duselis et al. |
| 6,534,176 B2 | 3/2003 | Terase et al. |
| 6,555,625 B1 | 4/2003 | Overbeek et al. |
| 6,590,025 B1 | 7/2003 | Carlson et al. |
| 6,635,735 B1 | 10/2003 | Zhang et al. |
| 6,638,567 B1 | 10/2003 | Beisele |
| 6,638,998 B2 | 10/2003 | Zhao et al. |
| 6,641,629 B2 | 11/2003 | Safta et al. |
| 6,649,679 B1 | 11/2003 | Stockl et al. |
| 6,660,386 B2 | 12/2003 | Haque |
| 6,696,518 B1 | 2/2004 | Dersch et al. |
| 6,740,423 B2 | 5/2004 | Murase |
| 6,753,394 B2 | 6/2004 | Weikard et al. |
| 6,762,230 B2 | 7/2004 | Brandenburger et al. |
| 6,818,697 B2 | 11/2004 | Zhang et al. |
| 6,849,338 B2 | 2/2005 | Clemens |
| 6,893,751 B2 | 5/2005 | Naji et al. |
| 6,941,720 B2 | 9/2005 | DeFord et al. |
| 6,998,012 B2 | 2/2006 | Koelliker et al. |
| 7,049,352 B2 | 5/2006 | Gould et al. |
| 7,101,921 B2 | 9/2006 | Edwards et al. |
| 7,105,593 B2 | 9/2006 | Solomon et al. |
| 7,148,270 B2 | 12/2006 | Bowe |
| 7,235,595 B2 * | 6/2007 | Hermes et al. ............... 523/172 |
| 7,235,603 B2 | 6/2007 | Madle et al. |
| 7,238,391 B2 | 7/2007 | Dargontina et al. |
| 7,247,671 B2 | 7/2007 | Overbeek et al. |
| 7,265,166 B2 | 9/2007 | Gebhard et al. |
| 7,338,989 B2 | 3/2008 | Gross et al. |
| 7,381,785 B2 | 6/2008 | Detrembleur et al. |
| 7,449,516 B2 | 11/2008 | Bayer et al. |
| 7,758,954 B2 | 7/2010 | Nguyen et al. |

(56) References Cited

U.S. PATENT DOCUMENTS

| | | | |
|---|---|---|---|
| 7,812,090 B2 * | 10/2010 | Killilea et al. ............... 524/818 |
| 2002/0007009 A1 | 1/2002 | Stark et al. |
| 2002/0009622 A1 | 1/2002 | Goodson |
| 2002/0081437 A1 | 6/2002 | Dargontina et al. |
| 2002/0179240 A1 | 12/2002 | Clemens et al. |
| 2002/0195191 A1 | 12/2002 | Weiss et al. |
| 2003/0027915 A1 | 2/2003 | Gerst et al. |
| 2003/0055171 A1 | 3/2003 | Overbeek et al. |
| 2003/0073778 A1 | 4/2003 | Zhang et al. |
| 2003/0089061 A1 | 5/2003 | DeFord et al. |
| 2003/0150359 A1 | 8/2003 | Lassmann |
| 2003/0153673 A1 | 8/2003 | Schwalm et al. |
| 2003/0203991 A1 | 10/2003 | Schottman et al. |
| 2003/0207121 A1 | 11/2003 | McGee |
| 2003/0211346 A1 | 11/2003 | Kausch |
| 2003/0224184 A1 | 12/2003 | Hermes et al. |
| 2004/0002559 A1 | 1/2004 | Troutman et al. |
| 2004/0044094 A1 | 3/2004 | Garnett |
| 2004/0068045 A1 | 4/2004 | Betremieux et al. |
| 2004/0077782 A1 | 4/2004 | Heldmann et al. |
| 2004/0082715 A1 | 4/2004 | Bayer et al. |
| 2004/0086676 A1 | 5/2004 | Peng |
| 2004/0161542 A1 | 8/2004 | Ziemann et al. |
| 2004/0176502 A1 | 9/2004 | Raymond et al. |
| 2004/0198903 A1 | 10/2004 | Madle et al. |
| 2004/0229978 A1 | 11/2004 | Bowe |
| 2005/0009954 A1 | 1/2005 | Gebhard et al. |
| 2005/0020718 A1 | 1/2005 | Gosse et al. |
| 2005/0027079 A1 | 2/2005 | Palmer Lauer et al. |
| 2005/0053797 A1 | 3/2005 | Rumph et al. |
| 2005/0126430 A1 | 6/2005 | Lightner, Jr. et al. |
| 2005/0176321 A1 | 8/2005 | Crette et al. |
| 2005/0203211 A1 | 9/2005 | Gebhard |
| 2005/0208285 A1 | 9/2005 | Lyons et al. |
| 2006/0013950 A1 | 1/2006 | Porter et al. |
| 2006/0024480 A1 | 2/2006 | Lyons et al. |
| 2006/0046068 A1 | 3/2006 | Barancyk et al. |
| 2006/0048708 A1 | 3/2006 | Hartig |
| 2006/0111503 A1 | 5/2006 | Killilea et al. |
| 2006/0135684 A1 | 6/2006 | Killilea |
| 2006/0135686 A1 | 6/2006 | Kililea et al. |
| 2006/0182946 A1 | 8/2006 | Zarb et al. |
| 2006/0288909 A1 | 12/2006 | Naji et al. |
| 2007/0027233 A1 | 2/2007 | Yamaguchi et al. |
| 2007/0042192 A1 | 2/2007 | Nguyen et al. |
| 2007/0110981 A1 | 5/2007 | Killilea et al. |
| 2007/0149077 A1 | 6/2007 | Stanislawczyk et al. |
| 2007/0213445 A1 | 9/2007 | Klijn et al. |
| 2007/0259166 A1 | 11/2007 | Killilea et al. |
| 2007/0259188 A1 | 11/2007 | Wu et al. |
| 2007/0269660 A1 | 11/2007 | Killilea et al. |
| 2007/0282046 A1 | 12/2007 | Killilea et al. |
| 2008/0008895 A1 | 1/2008 | Garner et al. |
| 2008/0139737 A1 | 6/2008 | Alderfer et al. |
| 2008/0141908 A1 | 6/2008 | Peng et al. |

FOREIGN PATENT DOCUMENTS

| | | |
|---|---|---|
| CN | 1182724 A | 5/1998 |
| DE | 33 02 767 A1 | 8/1984 |
| EP | 0 060 505 A1 | 9/1982 |
| EP | 0 486 278 A1 | 5/1992 |
| EP | 0 623 659 A2 | 11/1994 |
| EP | 0 640 629 A1 | 3/1995 |
| EP | 0 697 417 A1 | 2/1996 |
| EP | 0 705 855 A2 | 4/1996 |
| EP | 0 725 088 A1 | 8/1996 |
| EP | 0 728 779 B2 | 8/1996 |
| EP | 0 757 059 A1 | 2/1997 |
| EP | 0 894 780 A1 | 2/1999 |
| EP | 1 118 632 A2 | 7/2001 |
| EP | 1 170 340 A1 | 1/2002 |
| EP | 1 454 935 A1 | 9/2004 |
| EP | 1 473 331 A1 | 11/2004 |
| EP | 1 505 088 A1 | 2/2005 |
| EP | 1 505 127 A1 | 2/2005 |
| EP | 1 589 083 A2 | 10/2005 |
| EP | 1 650 045 A2 | 4/2006 |
| EP | 1 798 258 A1 | 6/2007 |
| GB | 1 407 827 | 9/1975 |
| JP | 54 038323 | 3/1979 |
| JP | 01-229242 | 9/1989 |
| JP | 02 308887 | 12/1990 |
| JP | 08 059939 | 3/1996 |
| JP | 08-059939 | 3/1996 |
| JP | 11 236281 | 8/1999 |
| JP | 2000 344986 A | 12/2000 |
| JP | 2003 226835 A | 8/2003 |
| JP | 2003-251269 | 9/2003 |
| JP | 2004 010805 A | 1/2004 |
| JP | 2004 250607 A2 | 9/2004 |
| JP | 2004 292748 A2 | 10/2004 |
| JP | 2005-307161 | 4/2005 |
| JP | 2006 117812 | 5/2006 |
| SU | 833892 | 5/1981 |
| WO | WO 94/07674 A1 | 4/1994 |
| WO | WO 94/25499 A1 | 11/1994 |
| WO | WO 98/45222 | 10/1998 |
| WO | WO 99/67312 | 12/1999 |
| WO | WO 00/23495 A1 | 4/2000 |
| WO | WO 00/56826 | 9/2000 |
| WO | WO 01/68547 A1 | 9/2001 |
| WO | WO 02/070623 A2 | 9/2002 |
| WO | WO 03/000761 A1 | 1/2003 |
| WO | WO 03/076536 A1 | 9/2003 |
| WO | WO 03/101918 A2 | 12/2003 |
| WO | WO 2005/071179 A1 | 8/2005 |
| WO | WO 2006/032512 A | 3/2006 |
| WO | WO 2006/065914 A1 | 6/2006 |
| WO | WO 2007/059516 A1 | 5/2007 |
| WO | WO 2007/087458 A1 | 8/2007 |
| WO | WO 2007/089807 A2 | 8/2007 |
| WO | WO 2007/089913 A1 | 8/2007 |
| WO | WO 2007/090132 A1 | 8/2007 |
| WO | WO 2007/143622 A1 | 12/2007 |
| WO | WO 2008/018910 A2 | 2/2008 |

OTHER PUBLICATIONS

Witzeman, J. S. et al., *Comparison of Methods for the Preparation of Acetoacetylated Coating Resins*, Coatings Technology; vol. 62, No. 789, pp. 101-112 (Oct. 1990).

Clemens, R. J. et al., *A Comparison of Catalysts for Crosslinking Acetoacetylated Resins via the Michael Reaction*, Journal of Coatings Technology, Mar. 1989, vol. 61, No. 770, pp. 83-91.

Clemens, R. J., *A Comparison of Catalysts for Crosslinking Acetoacetylated Resins via the Michael Reaction*, Water-Borne & Higher Solids Coatings Symposium, 1988, New Orleans, LA, 55-67.

Wicks, Z.W. et al., *Epoxy and Phenolic Resins*, Organic Coatings Science and Technology, vol. 1, Chapter XI, pp. 162-187 (1992).

Tennebroek et al., *New Polymer Synthesis for (self) Crosslinkable Urethanes and Urethane Acrylics*, 4th Nürnberg Congress; International Centre for Coatings Technology, Paper 17, 2000, 19 pages.

Geurts, J.M. et al., *Self-crosslinkable Urethanes and Urethane/Acrylics*, Verfkroniek Nummer, Jan. 1999.

Geon® Lo-Sope Dispersion Resin, Geon® 171 Vinyl Chloride Homopolymer Technical Data Sheet, PolyOne Corporation, May 2003, 2 pages.

Geon Copolymer Dispersion Resin Geon® 137 Vinyl Chloride Copolymer Technical Data Sheet, PolyOne Corporation, Apr. 1997, 2 pages.

Industrial Research Services, *Test Report No. 54703-1 for Epirez Safe Step 100*, CSIRO, Manuf. & Infrastr. Technology, Australia, May 2004, pp. 1-6.

DSM NeoResins, Technical Data Sheet, DSM NeoResins Inc.,Bulletin XK-90, Jan. 2006, 6 pages.

Tex•Cote® Stretch Product Information, Textured Coatings of America, Inc., Panama City, Florida, Nov. 2003, 3 pages.

UCAR Emulsion Systems Applications, *Architectural Coatings—Exterior—Cement Fiber Board*, Dow Chemical Company product (56) References Cited

OTHER PUBLICATIONS information sheet printed on Oct. 25, 2007 from the following internet archives website at: http://web.archive.org/web/20041022123748/http://www.dow.com/ucarlatex/app/arch/ex_fiber.htm.

Rector, F.D. et al., *Applicatons for the Acetoacetyl Chemistry in Thermoset Coatings*, Journal of Coatings Technology, vol. 61, No. 771, Apr. 1989.

American Society of Testing Materials, ASTM Designation: D523-89 (Reapproved 1999), "Standard Test Method for Specular Gloss;" 5 pages.

American Society of Testing Materials, ASTM Designation: D5402-93 (Reapproved 1999), "Standard Practice for Assessing the Solvent Resistance of Organic Coatings Using Solvent Rubs;" 3 pages.

Eastman Chemical Company, Publications N-319C, Kingport, TN., Title Page, Table of Contents, "Acetoacetoxyethyl Methacrylate (AAEM) Acetoacetyl Chemistry," pp. 1-11 (Dec. 1999).

Lewis et al., "Luminescence", Hawley's Condensed Chemical Dictionary, 14$^{th}$ Ed., John Wiley and Sons, Inc., retrieved from Knovel® online; 1 page (2002).

"Photoinitiators for UV Curing," "Darocur 1173", p. 2; Ciba Specialty Chemicals; no date available; 8 pages.

U.S. Federal Register, vol. 60, No. 116, pp. 31633-31637 (Jun. 16, 1995).

Wicks, Zeno W. Jr., et al., "Latexes", Organic Coatings, Science and Technology, Second Edition, (Wiley-Interscience, New York, 1999), Title Page, Copyright Page, Chapter 8, p. 143.

Dow® Z-6018 Intermediate Product Information, "Silicone Intermediates", 3 pgs., (Aug. 28, 2006).

ASTM D6944-03, Test Method A (2003).

"Ancarez AR550 Waterborne Epoxy Resin Technical Bulletin", Air Products and Chemicals, Inc., High Performance Coatings Resins, Pub. No. 125-9914, 13 pages, (Mar. 2006).

"Anquamine 401 Curing Agent Technical Bulletin", Air Products and Chemicals, Inc., Epoxy Curing Agents and Modifiers, Publication No. 125-9744, 1 page, (May 2004).

"Polycat 41 Catalyst", Product Information Sheet, Air Products and Chemicals, Inc., 2 pages, (2003).

"UV Cured Undercoat Vitrecure 7", Product Data Sheet 74, Architectural & Industrial Coatings, 1 page (Dec. 21, 2004).

"UV Cured Sealer for Cement Based Substrates Vitrecure 9", Product Data Sheet 54, Architectural & Industrial Coatings, 1 page (Jul. 24, 2004).

Fox, T. G., "Influence of diluent and of copolymer composition on the glass temperature of a polymer system", Bull. Am. Phys. Soc. I (3), 123 (1956).

PQ® Potassium Silicates, PQ Corporation Brochure, (2004).

Epoxy Resins Chemistry and Technology 2nd Edition, Revised and Expanded—Tanaka, Yoshio: Synthesis and Characteristics of Epoxides, p. 54 (1988).

"*ASTM C920-11 Standard Specification for Elastomeric Joint Sealants*" Abstract, Book of Standards, 2 pages, (vol. Apr. 2007).

"*ASTM C834-10 Standard Specification for Latex Sealants*" Abstract, Book of Standards, 2 pages, (vol. Apr. 2007).

Gardner's Commercially Important Chemicals, edited by G.W.A Milne, Wiley, p. 573 (2005).

NaH2PO4 MSDS, found at http://muby.itgo.com/MSDS/sodium_phosphate_monobasic_anhyd%20MSDS.htm.

Hardiplank™ Lap Siding Installation, James Hardie Siding Products, 8 pages, (Dec. 2005), http://www.jameshardie.com/homeowner/technical/installation/hardieplank_installation.php, downloaded from the Dec. 15, 2005 Internet Archive entry at: http://web.archive.org/web/20051215084041/http://www.jameshardie.com/homeowner/installation/hardiplank_installation.php.

"Siding Painting Tips", Paint Manufacturers' Recommendation Sheet—No. S-100, James Hardie Siding Products, 10 pages, (May 2005), http://www.jameshardie.com/homeowner/technical/paintingtips.php, downloaded from the Dec. 14, 2005 Internet Archive entry at: http://web.archive.org/web/20051214022056/http://www.jameshardie.com/homeowner/technical/paintingtips.php.

Araujo, P.H.H. et al., "Techniques for Reducing Residual Monomer Content in Polymers: A Review", Polymer Engineering and Science, vol. 42, No. 7, pp. 1442-1468 (Jul. 2002).

Michigan State University Extension—Home Maintenance and Repair: Paint Problems, Jun. 24, 2003 and can be found at: http://www.msue.msu.edu/objects/content_revision/download.cfm/revision_id.498884/workspace_id.-4/01500572.html/.

EPS 4203 Technical Data Sheet (May 25, 2011).

EPS 4203 Material Safety Data Sheet (May 10, 2013).

EPS 4213 Technical Data Sheet (May 26, 2011).

EPS 4213 Material Safety Data Sheet (May 10, 2013).

Lux 399 Technical Data Sheet (Dec. 15, 2010).

Lux 399 Material Safety Data Sheet (Apr. 29, 2011).

\* cited by examiner

HIGH PERFORMANCE AQUEOUS COATING COMPOSITIONS

CROSS-REFERENCE TO RELATED APPLICATION

This application is a division of application Ser. No. 11/757,916 filed Jun. 4, 2007, which in turn claims priority from U.S. Provisional Application Ser. No. 60/810,739, filed Jun. 2, 2006, the disclosure of which is incorporated herein by reference.

BACKGROUND

Hard, abrasion resistant coatings are used over a variety of substrates, including, for example, cement, wood, and porous substrates. Particularly demanding substrates to coat include horizontal substrates such as sidewalks, floor tiles, cement garage floors and wood decks. Unfortunately, many of the commercially available coatings in use today for these surfaces suffer from problems such as poor adhesion, or poor water resistance (e.g., "blushing").

An issue with cement and fiber cement substrates is that they typically require hard, abrasion resistant coatings with excellent adhesion. In the past, this has been addressed with higher-Tg polymer systems. Unfortunately, volatile organic content (VOC) solvents generally must be used to achieve proper coalescence of higher-Tg polymers. Consequently, there is an unmet need to develop acceptable low VOC aqueous based coatings for cement substrates that are hard, blush resistant, abrasion resistant and offer excellent adhesion.

In addition, there is an unmet need for improved fiber cement articles that resist damage from repeated freezing and thawing of water that is absorbed into the substrate. This need is particularly acute in colder climates where freeze-thaw mechanisms can occur. Another problem is that prefinished fiber cement siding products can be visually marred or damaged during storage. One damage mechanism is caused as a result of the heavy boards being stacked against each other. In some cases the weight against the bottom boards can exceed about 6 to 10 kg/cm2. The great weight can cause damage to the finish. In particular, the peaks of the embossed surface can be crushed, and the flattened peak can appear as a glossy spot.

SUMMARY

The present invention provides in one aspect a coating composition including water, a multistage latex polymer and a silane coupling agent. The multistage latex polymer includes two or more polymer stages where each stage has a different Tg. The multistage latex polymer can optionally include acetoacetoxy functionality. The silane coupling agent may optionally contain one or more functional group (e.g., amino or epoxy groups).

In another aspect, a coating composition is provided including water, a acetoacetoxy-functionalized latex polymer and an epoxy-functional silane-coupling agent. In this embodiment the latex may be a single stage or a multistage latex polymer.

In another embodiment, the multistage latex polymer includes at least one soft stage having a Tg between about −65 and about 30° C. and at least one hard stage having a Tg between about 30 and about 230° C.

In another aspect, the invention provides a method for preparing a coated article, which method includes providing a cement fiberboard substrate, coating at least a portion of the substrate with the above-described coating system and allowing the coating system to harden.

In yet another aspect, the present invention provides coated articles. One preferred article includes a fiber cement substrate having at least one major surface and a coating composition including water, a multistage latex polymer and a silane coupling agent applied on the major surface.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWING

Like reference symbols in the various figures of the drawing indicate like elements. The elements in the drawing are not to scale.

DETAILED DESCRIPTION

A "latex" polymer means a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a coating composition that contains "an" additive means that the coating composition includes "one or more" additives.

The terms "board" or "fiberboard" refer to a generally planar component suitable for attachment to a building exterior surface, including lap siding, vertical siding, soffit panels, trim boards, shingle replicas, stone replicas and stucco replicas.

The phrase "low VOC" when used with respect to a liquid coating composition means that the coating composition contains less than about 10 weight % volatile organic compounds, more preferably less than about 7% volatile organic compounds, and most preferably less than about 4% volatile organic compounds based upon the total liquid coating composition weight.

The term "(meth)acrylic acid" includes either or both of acrylic acid and methacrylic acid, and the term "(meth)acrylate" includes either or both of an acrylate and a methacrylate.

The term "multistage" when used with respect to a latex means the latex polymer was made using discrete charges of one or more monomers or was made using a continuously-varied charge of two or more monomers. Usually a multistage latex will not exhibit a single Tg inflection point as measured using DSC. For example, a DSC curve for a multistage latex made using discrete charges of one or more monomers may exhibit two or more Tg inflection points. Also, a DSC curve for a multistage latex made using a continuously-varied charge of two or more monomers may exhibit no Tg inflection points. By way of further explanation, a DSC curve for a single stage latex made using a single monomer charge or a non-varying charge of two monomers may exhibit only a single Tg inflection point. Occasionally when only one Tg inflection point is observed, it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

The terms "topcoat" or "final topcoat" refer to a coating composition which when dried or otherwise hardened provides a decorative or protective outermost finish layer on a substrate, e.g., a fiber cement board attached to a building exterior. By way of further explanation, such final topcoats include paints, stains or sealers capable of withstanding extended outdoor exposure (e.g., exposure equivalent to one year of vertical south-facing Florida sunlight) without visually objectionable deterioration, but do not include primers that would not withstand extended outdoor exposure if left uncoated with a topcoat.

The term "cementitious" refers to a substrate or material that comprises cement and has the properties or characteristics of cement, or comprises a chemical precipitate, preferably of carbonates, having the characteristics of cement. Examples of cementitious substrates and materials include cement floors (e.g. garage floors), floor tiles, fiber cement boards, and the like.

The term "organic group" refers to a hydrocarbon (e.g., hydrocarbyl) group with optional elements other than carbon and hydrogen in the chain, such as oxygen, nitrogen, sulfur, and silicon that is classified as an aliphatic group, cyclic group, or combination of aliphatic and cyclic groups (e.g., alkaryl or aralkyl groups). The term "aliphatic group" refers to a saturated or unsaturated linear or branched hydrocarbon group. For example, this term is used to encompass alkyl, alkenyl, and alkynyl groups. The term "alkyl group" refers to a saturated linear or branched hydrocarbon group including, for example, methyl, ethyl, isopropyl, t-butyl, heptyl, dodecyl, octadecyl, amyl, 2-ethylhexyl, and the like. The term "alkenyl group" refers to an unsaturated linear or branched hydrocarbon group with one or more carbon-carbon double bonds. Non-limiting examples of alkenyl groups include groups such as vinyl, 1-propenyl, 2-propenyl, 1,3-butadienyl, 1-butenyl, 2-butenyl, 1-pentenyl, 2-pentenyl, 1-hexenyl, 2-hexenyl, heptenyl, octenyl and the like. The term "alkynyl group" refers to an unsaturated linear or branched hydrocarbon group with one or more carbon-carbon triple bonds. Non-limiting examples of alkynyl groups include ethynyl, 1-propynyl, 2-propynyl, 1-butynyl, 2-butynyl, 3-butynyl, 1-pentynyl, 2-pentynyl, 1-hexynyl, 2-hexynyl, heptynyl, octynyl and the like. The term "cyclic group" refers to a closed ring hydrocarbon group that can be classified as an alicyclic group, aromatic group (aryl group), or heterocyclic group. The term "alicyclic group" refers to a cyclic hydrocarbon group having properties resembling those of aliphatic groups. Non-limiting examples of alicyclic groups include cyclopropyl, cyclobutyl, cyclopentyl, cyclohexyl, cycloheptyl, cyclooctyl and the like. The terms "aromatic group" or "aryl group" refer to a mono- or polycyclic aromatic hydrocarbon group such as phenyl or naphthyl. The term "heterocyclic group" refers to a closed ring hydrocarbon group in which one or more of the atoms in the ring is an element other than carbon (e.g., nitrogen, oxygen, sulfur, etc.).

Substitution can occur on the organic groups of the coalescents used in the coating compositions of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes substituted and unsubstituted groups, where the substituent groups can include O, N, Si, or S atoms, for example, in the chain (e.g., an alkoxy group) as well as carbonyl groups and other conventional substituent groups. For example, the phrase "alkyl group" is intended to include not only pure open chain saturated hydrocarbon alkyl substituents, such as methyl, ethyl, propyl, t-butyl, and the like, but also includes substituted alkyl groups having substituents known in the art, such as hydroxy, alkoxy, alkylsulfonyl, halogen atoms, cyano, nitro, amino, carboxyl, and the like. Thus, "alkyl group" can include ether groups, haloalkyls, nitroalkyls, carboxyalkyls, hydroxyalkyls, sulfoalkyls, and the like. When the term "moiety" is used to describe a chemical compound or substituent, only the unsubstituted chemical material is intended to be included. Thus, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon.

The term "comprises" and variations thereof does not have a limiting meaning where such term appears in the description or claims. Thus, a composition having an ethylenically unsaturated compound means that the composition includes one or more of the ethylenically unsaturated compounds.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The present invention provides high performance, preferably low VOC coating compositions for application to substrates such as wood, cement, tiles, or fiber cement substrates. Articles including the coatings are also provided.

Figure 1:
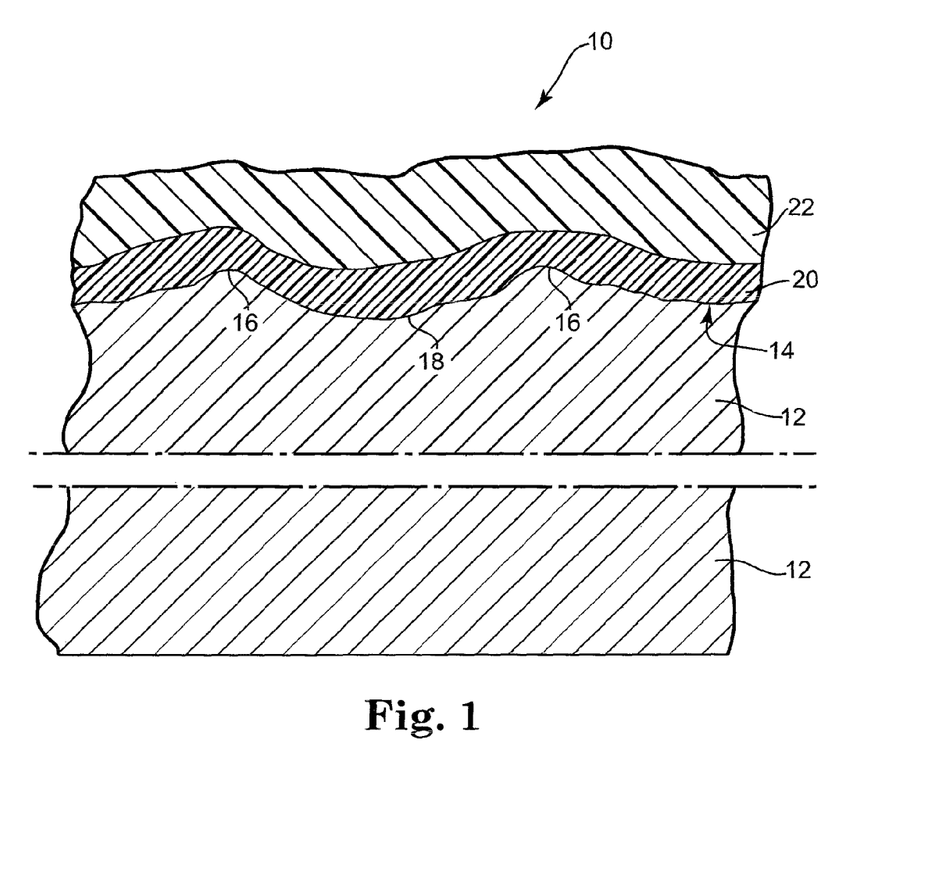
FIG. 1 is a schematic cross-sectional view of a coated fiber cement article.

Referring to FIG. 1, a coated article 10 of the present invention is shown in schematic cross-sectional view. Article 10 includes a cement fiberboard substrate 12. Substrate 12 typically is quite heavy and may for example have a density of about 1 to about 1.6 g/cm3 or more. The first major surface 14 of substrate 12 may be embossed with small peaks or ridges 16 and valleys 18, e.g., so as to resemble roughsawn wood. Major surface 14 may have a variety of other surface configurations, and may resemble a variety of building materials other than roughsawn wood. Layer or layers 20 of the disclosed coating composition lie atop and may optionally partially penetrate surface 14, and desirably are applied to article 10 at the location where article 10 is manufactured. Layers 20 help to protect substrate 12 against one or more of exposure to moisture, freeze-thaw cycles, UV exposure or atmospheric carbon dioxide. Layers 20 also may provide a firmly-adhered base layer upon which one or more firmly-adhered layers of final topcoat 22 may be formed. Optional final topcoat 22 desirably is both decorative and weather-resistant, and may be applied to article 10 at the location where article 10 is manufactured or after article 10 has been attached to a building or other surface.

The disclosed compositions may be applied to a variety of substrates, including wood, cement, tiles, or fiber cement substrates. The compositions are particularly adapted to coat wood or cement floors, decks, as well as fiber cement substrates. A variety of fiber cement substrates may be employed. Fiber cement substrates typically are composites made from cement and filler. Exemplary fillers include wood, fiberglass, polymers or mixtures thereof. The substrates can be made using methods such as extrusion, the Hatschek method, or other methods known in the art. See, e.g., U.S. Patent Application No. 2005/0208285 A1 (corresponds to International Patent Application No. WO 2005/071179 A1); Australian Patent Application No. 2005100347; International Patent Application No. WO 01/68547 A1; International Patent Application No. WO 98/45222 A1; U.S. Patent Application No. 2006/0288909 A1; and Australian Patent Application No. 198060655 A1. Fiber cement composites can include unprimed fiber cement substrates and commercially available pre-primed or pre-painted fiber cement substrates which may be top coated as described below. Non-limiting examples of such substrates include siding products, boards and the like, for uses including fencing, roofing, flooring, wall boards, shower boards, lap siding, vertical siding, soffit panels, trim boards, shaped edge shingle replicas and stone or stucco replicas. One or both major surfaces of the substrate may be profiled or embossed to look like a grained or roughsawn wood or other building product, or scalloped or cut to resemble shingles. The uncoated substrate surface typically contains a plurality of pores with micron- or submicron-scale cross-sectional dimensions.

A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICET™ cement board products from Zhangjiagang Evernice Building Materials Co., Ltd. of China and E BOARD™ cement board products from Everest Industries Ltd. of India.

The disclosed articles may be coated on one or more surfaces with one or more layers of the coating composition. For example, in one preferred embodiment the coating composition can include an optional primer layer and one or more topcoat layers. An optional sealer layer underneath the primer layer may also be utilized, if desired. Preferably, the various layers are selected to provide a coating system that has good adhesion to the substrate and between adjacent layers of the system.

Exemplary optional sealer layers include acrylic latex materials. The typical function of a sealer layer is to provide one or more features such as improved adhesion, efflorescence blocking, water resistance or block resistance. Non-limiting sealers include unpigmented or low pigment level latex coatings having, for example, between about 5 and 20 weight % solids. An example of a commercially available sealer is OLYMPIC™ FC sealer (available from PPG Industries).

Exemplary optional primer layers include acrylic latex or vinyl primers. The primer may include color pigments, if desired. Preferred primers have a 60-degree gloss value of less than about 15, more preferably less than about 10, and optimally less than about 5 percent. Preferred primers have a pigment volume concentration (PVC) of greater than about 40%.

Other exemplary coating compositions for use under the coatings of this invention include those compositions and systems described in co-pending U.S. patent application Ser. Nos. 11/669,131 and 11/669,134, filed on Jan. 30, 2007; and International Patent Application Serial Nos. PCT/US07/61327 and PCT/US07/02587, filed on Jan. 30, 2007.

Suitable compositions of the present invention may be formulated using functionalized latex polymers such as are described herein and in published U.S. Patent Application Nos. 2006/0135684 A1, 2006/0135686 A1; "multistage" latex polymers, such as are described herein and in U.S. Patent Application No. 2007/0110981, published May 17, 2007; and functionalized, multistage latex polymers.

The latex polymer is preferably prepared through chain-growth polymerization, using one or more ethylenically unsaturated monomers. Non-limiting examples of ethylenically unsaturated monomers include monomers such as acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, hydroxypropyl acrylate, hydroxypropyl methacrylate, glycidyl acrylate, glycidyl methacrylate, 4-hydroxybutyl acrylate glycidylether, 4-hydroxybutyl methacrylate glycidylether, acrylamide, methylacrylamide, diacetone acrylamide, methylol(meth)acrylamide, acrylonitrile, styrene, a-methyl styrene, vinyl toluene, vinyl acetate, vinyl propionate, allyl methacrylate, or mixtures thereof. If desired, the latex polymer may be formed using one or more acidic monomers. For example, the latex polymers may include up to about 5 weight % methacrylic acid or acrylic acid based on the total weight of the latex polymer.

In another embodiment, the coating system includes a functionalized latex polymer that incorporates acetoacetyl functionality. Acetoacetyl functionality may be incorporated into the polymer through the use of an acetoacetyl functional olefinic monomer such as acetoacetoxyethyl acrylate, acetoacetoxypropyl methacrylate, allyl acetoacetate, acetoacetoxybutyl methacrylate, 2,3-di(acetoacetoxy)propyl methacrylate, 2-(acetoacetoxy) ethyl methacrylate, t-butyl acetoacetate, and the like or combinations thereof. The acetoacetyl functional latex polymer may for example be prepared through chain-growth polymerization, using, for example, 2-(acetoacetoxy)ethyl methacrylate (AAEM). A polymerizable hydroxy functional or other active hydrogen containing monomer may also be converted to the corresponding acetoacetyl functional monomer by reaction with diketene or other acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol. 62, 1990, 101 (and citations contained therein)). Preferred latex polymers include at least about 0.5 weight % acetoacetyl functionality, more preferably about 0.5 to about 5 weight % acetoacetyl functionality, and most preferably about 2 to about 7.5 weight % acetoacetyl functionality based on the total weight of the latex polymer. Such functionalized latex polymers are described in U.S. Patent Application Publication Nos. 2006/0135684 A1 and 2006/0135686 A1. In preferred coating compositions, the acetoacetyl functional group is incorporated into the latex polymer via 2-(acetoacetoxy)ethyl methacrylate, t-butyl acetoacetate, diketene, or combinations thereof.

In another preferred embodiment, the composition contains a multistage latex polymer that optionally is functionalized (e.g., incorporates acetoacetyl functionality). Preferably, the latex polymer includes from about 0.5 to about 5 weight % acetoacetoxy functional monomer, based on the total weight of the latex polymer. Exemplary multistage latex polymer compositions contain at least two polymers of different glass transition temperatures (viz., different Tg values) and may be prepared via emulsion polymerization using many of the aforementioned monomers. In one preferred embodiment, the latex will include a first polymer stage (the "soft stage") having a Tg less than 30° C., e.g., between about −65 and 30° C., more preferably between about −15 and 25° C., and most preferably between about −5 and 15° C. and a second polymer stage (the "hard stage") having a Tg greater than 30° C., e.g., between about 30 and 230° C., more preferably between about 30 and 125° C., and most preferably between 60 and 100° C.

Multistage latexes are conveniently produced by sequential monomer feeding techniques. For example, a first monomer composition is fed during the early stages of the polymerization, and then a second different monomer composition is fed during the later stages of the polymerization. In certain embodiments it may be favorable to start the polymerization with a high Tg monomer composition and then switch to a low Tg monomer composition, while in other embodiments, it may be favorable to start the polymerization with a low Tg monomer composition and then switch to a high Tg monomer composition.

Numerous hard and soft stages may also be utilized. For example, in certain compositions it may be beneficial to polymerize two different low Tg soft stage monomer compositions after the hard stage polymer is formed. The first soft stage may be for example prepared with a monomer whose homopolymer has a Tg close to room temperature (e.g., 20° C.) and the second soft stage may be prepared with monomer whose homopolymer has a Tg well below room temperature (e.g., less than 5° C.). While not intending to be bound by theory, it is believed that this second soft stage polymer assists with improving coalescence of the latex polymer particles.

It may be advantageous to use a gradient Tg latex polymer made using continuously varying monomer feeds. The resulting polymer will typically have a DSC curve that exhibits no Tg inflection points, and could be said to have an essentially infinite number of Tg stages. For example, one may start with a high Tg monomer composition and then at a certain point in the polymerization start to feed a low Tg soft stage monomer composition into the reactor with the high Tg hard stage monomer feed. The resulting multistage latex polymer will have a gradient Tg from high to low. A gradient Tg polymer may also be used in conjunction with multiple multistage Tg polymers. As an example, a high Tg monomer feed (F1) and a low Tg monomer feed (F2) can be prepared. The process would begin by adding feed F1 into the latex reactor vessel and initiate polymerization. After a certain period during the F1 feed, the feed F2 is added into F1 wherein the F2 feed rate is faster than the overall feed rate of F1+F2 into the reactor vessel. Consequently, once the F2 feed into F1 is complete, the overall Tg of the F1+F2 monomer feed blend will be a lower Tg "soft stage" monomer composition.

The disclosed multistage latex polymer compositions preferably include about 5 to about 95 weight percent soft stage polymer morphology, more preferably about 50 to about 90 weight percent soft stage polymer morphology, and most preferably about 60 to about 80 weight percent soft stage polymer morphology based on total polymer weight. The disclosed multistage latex polymer compositions preferably include about 5 to 95 weight percent hard stage polymer morphology, more preferably about 10 to about 50 weight percent hard stage polymer morphology, and most preferably about 20 to about 40 weight percent hard stage polymer morphology based on total polymer weight.

Compositions of this embodiment preferably include a multistage latex polymer in an amount of at least 10 weight %, more preferably at least 25 weight %, and even more preferably at least 35 weight %, based on total solids of the composition. Compositions of this embodiment preferably include a multistage polymer in an amount of less than 100 weight %, more preferably less than 85 weight %, and even more preferably less than 80 weight %, based on the total solids of the composition.

The latex polymer is preferably prepared through chain-growth polymerization, using one or more ethylenically unsaturated monomers as mentioned above. The ratios of monomers in the disclosed multistage latex polymers may be adjusted to provide the desired level of "hard" or "soft" segments. The Fox equation may be employed to calculate the theoretical Tg of a polymer made from two monomer feeds:

$$1/T_g = W_a/T_{ga} + W_b/T_{gb}$$

where $T_{ga}$ and $T_{gb}$ are the respective glass transition temperatures of polymers made from monomers "a" and "b"; and $W_a$ and $W_b$ are the respective weight fractions of polymers "a" and "b".

For example, a soft segment may be introduced by providing a monomer composition containing 5 to 65 parts butyl acrylate, 20 to 90 parts butyl methacrylate, 0 to 55 parts methyl methacrylate, 0.5 to 5 parts (meth)acrylic acid, and 0 to 20 parts AAEM. In contrast a hard segment may be introduced by providing a monomer composition including 0 to 20 parts butyl acrylate, 0 to 40 parts butyl methacrylate, 45 to 95 parts methyl methacrylate, 0.5 to 5 parts (meth)acrylic acid and 0 to 20 parts AAEM. A soft segment may also be introduced by providing a monomer composition containing 5 to 65 parts butyl acrylate, 20 to 90 parts butyl methacrylate, 0 to 55 parts methyl methacrylate, 0 to 5 parts (meth)acrylic acid and 0 to 20 parts 2-(acetoacetoxy)ethyl methacrylate (AAEM), and a hard segment may be introduced by providing a monomer composition containing 0 to 20 parts butyl acrylate, 0 to 40 parts butyl methacrylate, 45 to 95 parts methyl methacrylate, 0 to 5 parts (meth)

acrylic acid and 0 to 20 parts AAEM. The aforementioned compositions are illustrative of this concept and other compositions can be used in the practice of this invention. A preferred embodiment can include at least 15 weight % butyl methacrylate based upon total latex polymer solids. If desired, the latex polymer may be formed using one or more acidic monomers. For example, the latex polymers may include up to about 5 weight % methacrylic acid and/or acrylic acid based on the total weight of the latex polymer. If functionalized, the multistage latex polymer preferably incorporates acetoacetyl functionality, which may be incorporated into the multistage polymer as described above.

The latex polymers disclosed above (whether single stage or multistage) may be stabilized by one or more nonionic or anionic emulsifiers (e.g., surfactants), used either alone or together. Examples of suitable nonionic emulsifiers include tert-octylphenoxy-ethylpoly(39)-ethoxyethanol, dodecyloxypoly(10)ethoxyethanol, nonylphenoxyethyl-poly(40) ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with ethylene oxide, N-polyoxyethylene(20)lauramide, N-lauryl-N-polyoxyethylene(3)amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, or ammonium salts of phosphate esters of ethoxylated nonylphenol or tridecyl alcohol, sodium octoxynol-3-sulfonate, sodium cocoyl sarcocinate, sodium 1-alkoxy-2-hydroxypropyl sulfonate, sodium alpha-olefin ($C_{14}$-$C_{16}$)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate.

The multistage latex polymer may also be prepared with a high Tg alkali-soluble polymer hard stage. Alkali-soluble polymers may be prepared by making a polymer with acrylic or methacrylic acid or other polymerizable acid monomer (usually at greater than 7 weight %) and solubilizing the polymer by addition of ammonia or other base. Examples of suitable alkali-soluble high Tg support polymers include JONCRYL™ 675 and JONCRYL 678 oligomer resins, available from BASF. A low Tg soft stage monomer composition or gradient Tg composition could then be polymerized in the presence of the hard stage alkali-soluble polymer to prepare a multistage latex polymer. Another exemplary process for preparing alkali soluble supported polymers is described in U.S. Pat. No. 5,962,571. For coating compositions containing acetoacetyl-functional polymers (particularly clear coatings), the use of a nitrogen-free base (e.g., an inorganic metal base such as KOH, CaOH, NaOH, LiOH, etc.) may also be utilized.

One or more water-soluble free radical initiators typically are used in the chain growth polymerization of the multistage latex polymer. Initiators suitable for use in the coating compositions will be known to persons having ordinary skill in the art or can be determined using standard methods. Representative water-soluble free radical initiators include hydrogen peroxide; tert-butyl peroxide; alkali metal persulfates such as sodium, potassium and lithium persulfate; ammonium persulfate; and mixtures of such initiators with a reducing agent. Representative reducing agents include sulfites such as alkali metal metabisulfite, hydrosulfite, and hyposulfite; sodium formaldehyde sulfoxylate; and reducing sugars such as ascorbic acid and isoascorbic acid. The amount of initiator is preferably from about 0.01 to about 3 weight %, based on the total amount of monomer. In a redox system the amount of reducing agent is preferably from 0.01 to 3 weight %, based on the total amount of monomer. The polymerization reaction can be performed at a temperature in the range of from about 10 to about 100° C.

Exemplary coating compositions may contain one or more optional ingredients that are VOCs. Such ingredients will be known to persons having ordinary skill in the art or can be determined using standard methods. Desirably the coating compositions are low VOC, and preferably include less than 10 weight %, more preferably less than 7 weight %, and most preferably less than 4 weight % VOCs based upon the total composition weight.

Exemplary coating compositions may contain one or more optional coalescents to facilitate film formation. Coalescents suitable for use in the coating compositions will be known to persons having ordinary skill in the art or can be determined using standard methods. Exemplary coalescents include glycol ethers such as EASTMAN™ EP, EASTMAN DM, EASTMAN DE, EASTMAN DP, EASTMAN DB and EASTMAN PM from Eastman Chemical Co. and ester alcohols such as TEXANOL™ ester alcohol from Eastman Chemical Co. Preferably, the optional coalescent is a low VOC coalescent such as is described in U.S. Pat. No. 6,762,230 B2. The coating compositions preferably include a low VOC coalescent in an amount of at least about 0.5 weight %, more preferably at least about 1 weight %, and yet more preferably at least about 2 weight %. The coating compositions also preferably include a low VOC coalescent in an amount of less than about 10 weight %, more preferably less than about 6 weight %, and yet more preferably less than about 4 weight %, based on the weight of the latex polymer.

The disclosed coating compositions preferably have a minimum film forming temperature (MFFT) about 0 to about 55° C., more preferably about 0 to about 20° C., when tested with a Rhopoint 1212/42, MFFT Bar-60, available from Rhopoint Instruments Ltd. of East Sussex, United Kingdom.

The coating compositions also contain a silane coupling agent. Exemplary silane coupling agents include non-functional silanes and functionalized silanes including amino-functional, epoxy-functional, acrylate-functional and other functional silane coupling agents. Dipodal silanes and oligomers may also be used. Functional silane coupling agents preferably contain a functional group that is capable of reacting with another component of the coating composition. For example, in one embodiment, the silane coupling agent has an epoxy functional group that may react with acetoacetoxy functionality on the latex polymer.

In a preferred embodiment, the silane coupling agent is an epoxy-functional silane coupling agent, and the multistage latex polymer includes acetoacetoxy functionality.

Suitable epoxy-functional silanes for use in the present invention include silanes having the formula $$R_1Si(R_2)_{3-n}(OR_3)_n,$$

where n is 1, 2, or 3, the $R_1$ group is alkyl, cycloalkyl, phenyl, cycloalkylalkyl, alkenylcycloalkyl, alkenylphenyl (e.g., benzyl), or phenylalkyl (e.g., tolyl), wherein the $R_1$ group contains at least one epoxy group. Each $R_2$ group is independently hydrogen, alkyl, cycloalkyl, phenyl, cycloalkylalkyl, alkenylcycloalkyl, alkenylphenyl (e.g., benzyl), phenylalkyl (e.g., tolyl), or a silane oligomer, wherein each $R_2$ group can optionally include $OR_3$ groups or epoxy functionality. Each $R_3$ group is independently hydrogen, alkyl, cycloalkyl, phenyl, cycloalkylalkyl, alkenylcycloalkyl, alkenylphenyl (e.g., benzyl), or phenylalkyl (e.g., tolyl). Preferred epoxy-functional silanes have an average molecular weight of from about 140 to about 500, more preferably from about 150 to about 300. Practical considerations such as solubility, hydrolysis rate, compatibility with the coating composition, polymer stability, and the like, may be considered when selecting the structure and molecular weight of the silane. In one embodiment, it is preferred that the molecular weight not exceed a maximum of about 190 to about 250, that n is 1 or 2, that $R_2$ is a methoxy or ethoxy group and that $R_1$ is an alkyl group of 3 to 8 carbon atoms and contains no more than one epoxy group.

Exemplary epoxy-functional silanes include β-(3,4 epoxy-cyclohexyl)-ethyltrimethoxysilane (available from Mitsubishi International Corporation as KBM303 and from Dow Corning as Z-6043), γ-glycidoxypropyltrimethoxysilane (available from Mitsubishi International Corporation as KBM403 and from Dow Corning as Z-6040), γ-glycidoxypropylmethyldiethoxysilane (available from Mitsubishi International Corporation as KBE402 and from Dow Corning as Z-6042), γ-glycidoxypropyltriethoxysilane (available from Dow Corning as Z-6041 and from GE Silicones as Silquest™ A-187), γ-glycidoxypropylmethyldiethoxysilane (available from Dow Corning as Z-6044), 5,6-epoxyhexyltriethoxysilane (available from Gelest, Inc. as SIE4675.0), hydrolyzates of the above and the like.

Suitable amino-functional silanes for use in the present invention include silanes having the formula where n is 1, 2, or 3, the $R_1$ group is alkyl, cycloalkyl, phenyl, cycloalkylalkyl, alkenylcycloalkyl, alkenylphenyl (e.g., benzyl), or phenylalkyl (e.g., tolyl), wherein the $R_1$ group contains at least one amino group. Each $R_2$ group is independently hydrogen, alkyl, cycloalkyl, phenyl, cycloalkylalkyl, alkenylcycloalkyl, alkenylphenyl (e.g., benzyl), or phenylalkyl (e.g., tolyl). Wherein the $R_1$ and $R_2$ groups can also be silane oligomers, which can optionally include $OR_3$ groups or amino functionality. Each $R_3$ group is independently hydrogen, alkyl, cycloalkyl, phenyl, cycloalkylalkyl, alkenylcycloalkyl, alkenylphenyl (e.g., benzyl), or phenylalkyl (e.g., tolyl). Preferred amino-functional silanes have an average molecular weight of from about 140 to about 500, more preferably from about 150 to about 300. Practical considerations such as solubility, hydrolysis rate, compatibility with the coating composition, polymer stability, and the like, may be considered when selecting the structure and molecular weight of the silane. In one embodiment, it is preferred that the molecular weight not exceed a maximum of about 190 to about 250, that n is 1 or 2, $R_2$ is a methoxy or ethoxy group and $R_1$ is an alkyl group having from 3 to 8 carbon atoms and contains no more than one amino group.

Exemplary amino-functional silanes include trimethoxysilylpropyldiethylene-triamine, N-methylaminopropyltrimethoxysilane, aminoethylaminopropylmethyl-dimethoxysilane, aminoethylaminopropyltrimethoxysilane (available from Dow Corning as Z-6020), aminopropylmethyldimethoxysilane, aminopropyltrimethoxysilane, polymeric aminoalkylsilicone, aminoethylaminoethylaminopropyl-trimethoxysilane, aminopropylmethyldiethoxysilane, aminopropyltriethoxysilane, 4-aminobutyltriethoxysilane, oligomeric aminoalkylsilane, m-aminophenyltrimethoxysilane, phenylaminopropyltrimethoxysilane, 1,1,2,4-tetramethyl-1-sila-2-azacyclopentane, aminoethylaminopropyltriethoxysilane, aminoethylaminoisobutylmethyldimethoxysilane, benzylethylenediaminepropyltrimethoxysilane, hydrolyzates of the above and the like.

Additional exemplary functional silanes include (3-acryloxypropyl)-trimethoxysilane, gamma-methacryloxypropyltrimethoxysilane, gamma-mercapto-propyltriethoxysilane, and olefinic silanes, such as vinyltrialkoxysilane, vinyltriacetoxysilane, alkylvinyldialkoxysilane, allyltrialkoxysilane, hexenyltrialkoxysilane and the like.

The disclosed coating compositions preferably include a silane in an amount of at least about 0.25 weight %, more preferably at least about 0.5 weight %, and even more preferably at least about 0.75 weight %, based on the weight of the latex polymer (polymer solids). The disclosed coating compositions preferably include a silane in an amount of less than about 10 weight %, more preferably less than about 6 weight %, and even more preferably less than about 4 weight %, based on the weight of the latex polymer.

Other optional additives for use in the coating compositions herein are described in Koleske et al., Paint and Coatings Industry, April, 2003, pages 12-86. Typical performance enhancing additives that may be employed include coalescing solvent(s), defoamers, dispersants, amines, preservatives, biocides, mildewcides, fungicides, glycols, surface active agents, pigments, colorants, dyes, surfactants, thickeners, heat stabilizers, leveling agents, anti-cratering agents, curing indicators, plasticizers, fillers, sedimentation inhibitors, ultraviolet-light absorbers, optical brighteners, and the like to modify properties.

The disclosed coating compositions may include a surface-active agent (surfactant) that modifies the interaction of the coating composition with the substrate or with a prior applied coating. The surface-active agent affects qualities of the composition including how the composition is handled, how it spreads across the surface of the substrate, and how it bonds to the substrate. In particular, the agent can modify the ability of the composition to wet a substrate. Surface-active agents may also provide leveling, defoaming or flow control properties, and the like. If it is used, the surface-active agent is preferably present in an amount of less than 5 weight %, based on the total weight of the coating composition. Surface-active agents suitable for use in the coating composition will be known to persons having ordinary skill in the art or can be determined using standard methods. Exemplary surface-active agents include those available under the trade designations STRODEX™ KK-95H, STRODEX PLF100, STRODEX PKOVOC, STRODEX LFK70, STRODEX SEK50D and DEXTROL™ 0050 from Dexter Chemical L.L.C. of Bronx, N.Y.; HYDROPALAT™ 100, HYDROPALAT 140, HYDROPALAT 44, HYDROPALAT 5040 and HYDROPALAT 3204 from Cognis Corp. of Cincinnati, Ohio; LIPOLIN™ A, DISPERS™ 660C, DISPERS 715W and DISPERS 750W from Degussa Corp. of Parsippany, N.J.; BYK™ 156, BYK 2001 and ANTI-TERRA™ 207 from Byk Chemie of Wallingford, Conn.; DISPEX™ A40, DISPEX N40, DISPEX R50, DISPEX G40, DISPEX GA40, EFKA™ 1500, EFKA 1501, EFKA 1502, EFKA 1503, EFKA 3034, EFKA 3522, EFKA 3580, EFKA 3772, EFKA 4500, EFKA 4510, EFKA 4520, EFKA 4530, EFKA 4540, EFKA 4550, EFKA 4560, EFKA 4570, EFKA 6220, EFKA 6225, EFKA 6230 and EFKA 6525 from Ciba Specialty Chemicals of Tarrytown, N.Y.; SURFYNOL™ CT-111, SURFYNOL CT-121, SURFYNOL CT-131, SURFYNOL CT-211, SURFYNOL CT 231, SURFYNOL CT-136, SURFYNOL CT-151, SURFYNOL CT-171, SURFYNOL CT-234, CARBOWET™ DC-01, SYRFYNOL 104, SURFYNOL PSA-336, SURFYNOL 420, SURFYNOL 440, ENVIROGEM™ AD-01 and ENVIROGEM AE01 from Air Products & Chemicals, Inc. of Allentown, Pa.; TAMOL™ 1124, TAMOL 850, TAMOL 681, TAMOL 731 and TAMOL SG-1 from Rohm and Haas Co. of Philadelphia, Pa.; IGEPAL™ CO-210, IGEPAL CO-430, IGEPAL CO-630, IGEPAL CO-730, and IGEPAL CO-890 from Rhodia Inc. of Cranbury, N.J.; T-DET™ and T-MULZ™ products from Harcros Chemicals Inc. of Kansas City, Kans.; polydimethylsiloxane surface-active agents (such as those available under the trade designations SILWET™ L-760 and SILWET L-7622 from OSI Specialties, South Charleston, W.Va., or BYK 306 from Byk-Chemie) and fluorinated surface-active agents (such as that commercially available as FLUORAD FC-430 from 3M Co., St. Paul, Minn.). The surface-active agent may be a defoamer. Exemplary defoamers include BYK 018, BYK 019, BYK 020, BYK 022, BYK 025, BYK 032, BYK 033, BYK 034, BYK 038, BYK 040, BYK 051, BYK 060, BYK 070, BYK 077 and BYK 500 from Byk Chemie; SURFYNOL DF-695, SURFYNOL DF-75, SURFYNOL DF-62, SURFYNOL DF-40 and SURFYNOL DF-110D from Air Products & Chemicals, Inc.; DEEFO™ 3010A, DEEFO 2020E/50, DEEFO 215, DEEFO 806-102 and AGITAN™ 31BP from Munzing Chemie GmbH of Heilbronn, Germany; EFKA 2526, EFKA 2527 and EFKA 2550 from Ciba Specialty Chemicals; FOAMAX™ 8050, FOAMAX 1488, FOAMAX 7447, FOAMAX 800, FOAMAX 1495 and FOAMAX 810 from Degussa Corp.; FOAMASTER™ 714, FOAMASTER A410, FOAMASTER 111, FOAMASTER 333, FOAMASTER 306, FOAMASTER SA-3, FOAMASTER AP, DEHYDRAN™ 1620, DEHYDRAN 1923 and DEHYDRAN 671 from Cognis Corp.

Exemplary coating compositions may contain one or more optional pigments. Pigments suitable for use in the coating compositions will be known to persons having ordinary skill in the art or can be determined using standard methods. Exemplary pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as Hansa yellow). The composition can also include a gloss control additive or an optical brightener, such as that commercially available under the trade designation UVITEX™ OB from Ciba-Geigy.

In certain embodiments it is advantageous to include fillers or inert ingredients in the composition. Fillers or inert ingredients extend, lower the cost of, alter the appearance of, or provide desirable characteristics to the composition before and after curing. Fillers and inert ingredients suitable for use in the coating composition will be known to persons having ordinary skill in the art or can be determined using standard methods. Exemplary fillers or inert ingredients include, for example, clay, glass beads, calcium carbonate, talc, silicas, feldspar, mica, barytes, ceramic microspheres, calcium metasilicates, organic fillers, and the like. Suitable fillers or inert ingredients are preferably present in an amount of less than 15 weight %, based on the total weight of the composition.

In certain applications it may also be desirable to include biocides or fungicides. Exemplary biocides or fungicides include ROZONE™ 2000, BUSAN™ 1292 and BUSAN 1440 from Buckman Laboratories of Memphis, Tenn.; POLYPHASE™ 663 and POLYPHASE 678 from Troy Chemical Corp. of Florham Park, N.J. and KATHON™ LX from Rohm and Haas Co.

The coating composition may also include other ingredients that modify properties of the coating composition as it is stored, handled, or applied, and at other or subsequent stages. Waxes, flatting agents, rheology control agents, mar and abrasion additives, and other similar performance enhancing additives may be employed as needed in amounts effective to upgrade the performance of the cured coating and the composition. Exemplary wax emulsions to improve coating physical performance include MICHEM™ Emulsions 32535, 21030, 61335, 80939M and 7173MOD from Michelman, Inc. of Cincinnati, Ohio and CHEMCOR™ 20N35, 43A40, 950C25 and 10N30 from ChemCor of Chester, N.Y. Exemplary rheology control agents include RHEOVIS™ 112, RHEOVIS 132, RHEOVIS152, VISCALEX™ HV30, VISCALEX AT88, EFKA 6220 and EFKA 6225 from Ciba Specialty Chemicals; BYK 420 and BYK 425 from Byk Chemie; RHEOLATE™ 205, RHEOLATE 420 and RHEOLATE 1 from Elementis Specialties of Hightstown, N.J.; ACRYSOL™ L TT-615, ACRYSOL RM-5, ACRYSOL RM-6, ACRYSOL RM-8W, ACRYSOL RM-2020 and ACRYSOL RM-825 from Rohm and Haas Co.; NATROSOL™ 250LR from Hercules Inc. of Wilmington, Del. and CELLOSIZE™ QP09L from Dow Chemical Co. of Midland, Mich. Desirable performance characteristics of the coating include chemical resistance, abrasion resistance, hardness, gloss, reflectivity, appearance, or combinations of these characteristics, and other similar characteristics. For example, the composition may include abrasion resistance promoting adjuvants such as silica or aluminum oxide (e.g., sol gel processed aluminum oxide).

The coating composition may be applied directly to the substrate or to an optionally sealed or primed substrate using any suitable application method. For example, the coating composition may be roll coated, sprayed, curtain coated, vacuum coated, brushed, or flood coated using an air knife system. For field applied coating systems, e.g. cement garage floors, floor tiles, decks, etc. it is common to apply the coating by roll, spray, or brush. For factory-applied applications, preferred application methods provide a uniform coating thickness and are cost efficient. Especially preferred application methods employ factory equipment that moves the substrate past a coating head and thence past suitable drying or curing equipment. The coating composition covers at least a portion of the first major surface of the board, and desirably covers the entire first major surface, in a substantially uniformly thick layer.

The composition preferably has a PVC (pigment volume concentration) of less than about 50 percent, more preferably less than about 35 percent, and most preferably less than about 25 percent.

A suitable multistage acetoacetyl functional latex polymer is prepared as follows. A reactor is charged with 500-800 parts of deionized water and 2-6 parts emulsifier. The reaction mixture is heated to 75°-80° C. under a nitrogen blanket. During heating, pre-emulsion 1 is formed having: 75-250 parts of deionized water, 2-9 parts of emulsifier, 0.2-0.6 parts persulfate initiator, 50-150 parts of butyl acrylate, 250-450 parts of butyl methacrylate, 0-40 parts of AAEM, and 5-30 parts of (meth)acrylic acid. In a separate vessel, pre-emulsion 2 is formed having: 75-250 parts of deionized water, 2-9 parts of emulsifier, 0.2-0.6 parts persulfate initiator (e.g., sodium persulfate), 150-500 parts of methylmethacrylate, 5-100 parts of butyl acrylate, 0-40 parts of AAEM, and 5-30 parts of (meth)acrylic acid. After the reaction mixture reaches 75° C., 1-6 parts of persulfate initiator is added to the reactor and the pre-emulsion 1 is added over a 1-3 hour feed rate. After pre-emulsion 1 is added, the container is rinsed with 20 parts deionized water and pre-emulsion 2 is added over a 1-3 hour feed rate. The reaction temperature is held between 80° C. and 85° C. during polymerization. After the pre-emulsion 2 feed is complete, the container is rinsed with 20 parts of deionized water and the reaction is held 30 minutes. A post reaction having of 0.5-1.5 parts t-butyl hydroperoxide mixed with 20 parts of deionized water and 0.3-1.5 parts of isoascorbic acid mixed with 20 parts of deionized water is then added over 30 minutes. The resulting latex polymer is then cooled to 40° C., 1 to 30 parts silane coupling agent is added, and a 28% concentrate ammonia is added to adjust the pH to 7.5-8.5.

A suitable coating of the present invention (Formula A) is made as follows: In a mixer is charged 10 to 50 parts water, 40 to 85 parts of a multistage latex polymer solution. If desired, 0 to 20 parts other additives may be introduced. If desired, 0 to 50 parts of pigments or flatting agents may be introduced. A suitable flatting agent is Byk Ceraflour 920 or similar flatting agent.

Preferred coatings resist crush damage. The crush resistance may be visually assessed and rated using a 1 to 5 rating scale, as described below, with 5 being essentially no damage and 1 being severe damage of the coating. Preferred coatings provide crush resistance when two face-to-face coated embossed substrates are subjected to a pressure of 6 $kg/cm^2$, more preferably when subjected to a pressure of 8 $kg/cm^2$, and most preferably when subjected to a pressure of 10 $kg/cm^2$. Coated products (e.g., fiber cement siding products) may be evaluated by a Visual Assessment of Crush Resistance test as described in U.S. Patent Application No. 2007/0110981, published May 17, 2007.

Preferred coatings also resist damage from hot tires. Coating substrates (e.g. cementitious substrates) may be evaluated by a visual assessment of hot tire pick up resistance as described herein. Over a 6"×6" (15.24×15.24 cm) pre-cast concrete block apply the coating at an application rate of 300 sq. ft./gal. (6.13 square meters per liter), with a minimum coated area of 3"×6" (7.62×15.24 cm) to accommodate an automobile tire section. After curing 4 hours, a second coat is applied. The coating on the concrete block is allowed to cure for 7 days at 20-25° C., and 35%-50% R.H. An automobile tire section, measuring approximately 6"×3" (15.24×7.62 cm), with wear approximating 6,000 to 10,000 miles (9660 to 16,090 km) is used in the test. A forced-convection laboratory oven is pre-heated to 140° F. (+/−2° F.) (60° C.) prior to placing the sample and tire sections into the oven for testing.

Hot Tire Test Procedure

After the coating has cured for 7 days, the test sample is submerged in water at 20-25° C. for 16 hours prior to initiating the test. After removing the test sample from the water bath, a wet cloth or towel is wrapped around the test sample, making sure it contacts the coating, and is placed in the pre-heated oven. The tire section to be used is placed in the oven also, though not on top of the sample at this point. Periodically, the cloth/towel is misted with water to maintain the moisture level. The test sample and tire section is allowed to remain in the oven for 1 hour. After 1 hour, the test sample and tire section are removed from the oven, and the cloth/towel is removed from the test sample. The test sample is placed on the lower plate of a laboratory press, with the coating facing up, and then the tire section is placed on top of the sample, centering the tire tread on the coated area of the sample. Using a contact area of 3"×6" (7.62×15.24 cm), a force of 2700 lbs. (1,224 kg) should be applied, generating 150 psi (1,034 kPa). This is intended to simulate the effect of a 5000 lb. (2,267 kg) vehicle driven onto the coated surface. The test sample and tire section is allowed to remain in the press for 1 hour. The press should be checked periodically to insure that the force applied remains constant. After 1 hour, the tire section and test sample are removed and evaluated.

Hot Tire Observation/Evaluation

After removing the test sample and tire section from the press, the tire section is removed from the top of the test sample, and observations are made as to whether any of the coating has delaminated from the surface. The coating is further examined and any marring, adhesion loss, or any latent prints/images left behind by the tire section are noted. In some cases, an image or print of the tire section may be left behind, but may not be readily visible unless the sample is tilted or observed at an angle. One portion of the coating should be cleaned with a commercial household cleaning product such as 409, and it should be noted whether the cleaner has removed any prints or images that existed on the coating, and whether the cleaner stained the coating. The coating should exhibit no declamation, marring, imprinting or other scuffing that cannot be removed by light cleaning with a household cleaner.

It is preferred that the coated articles are coated on at least one major surface with the coating system. More preferably, the coated articles are coated on a major surface and up to four minor surfaces including any edges. Most preferably, the coated articles are coated on all (e.g., both) major surfaces, and up to four minor surfaces including any edges.

The following examples are offered to aid in understanding of the present invention and are not to be construed as limiting the scope thereof. Unless otherwise indicated, all parts and percentages are by weight. The Tg inflection points were determined using a Q SERIES™ DSC thermal analysis instrument from TA Instruments of New Castle, Del.

Examples

Example 1

Multistage Acetoacetyl Functional Latex Polymer

Figure 2:
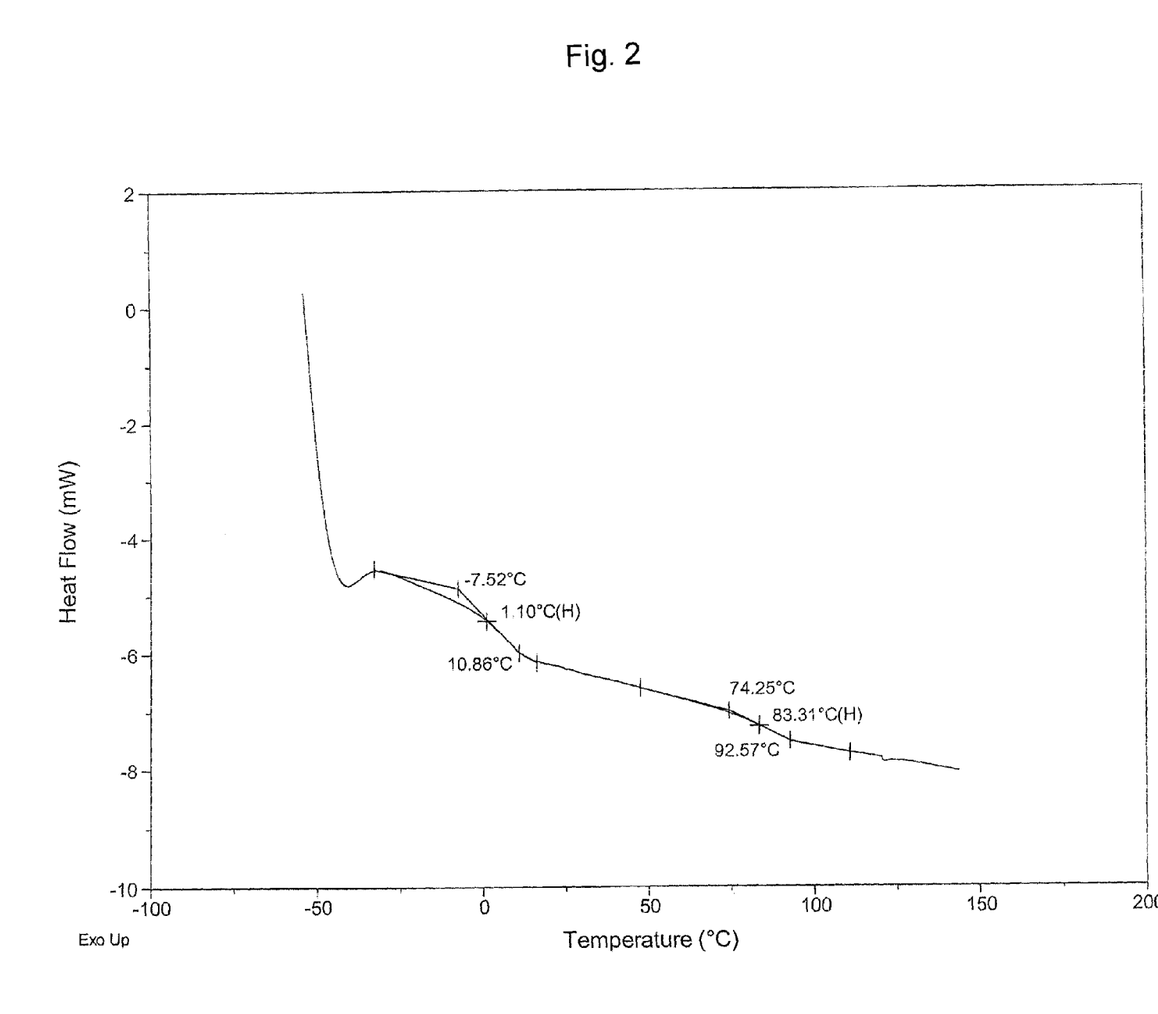
FIG. 2, FIG. 3 and FIG. 4 are differential scanning calorimetry (DSC) curves showing Tg values for various latex polymers.

An acetoacetyl functional multistage latex polymer was prepared from a first monomer mixture containing butyl acrylate, butyl methacrylate, AAEM, acrylic acid, and methacrylic acid and a second monomer mixture containing methyl methacrylate, butyl acrylate, AAEM, and acrylic acid. To 100 parts polymer were added five parts AAEM and 0.8 parts γ-glycidoxypropyltriethoxysilane. FIG. 2 shows the DSC curve, and demonstrates that the polymer exhibited two distinct Tg values, namely a soft stage Tg at about 1.1° C. and a hard stage Tg at about 83.3° C. Solids were 40% and the MMFT was less than 10° C.

Example 2

Multistage Acetoacetyl Functional Latex Polymer

Figure 3:
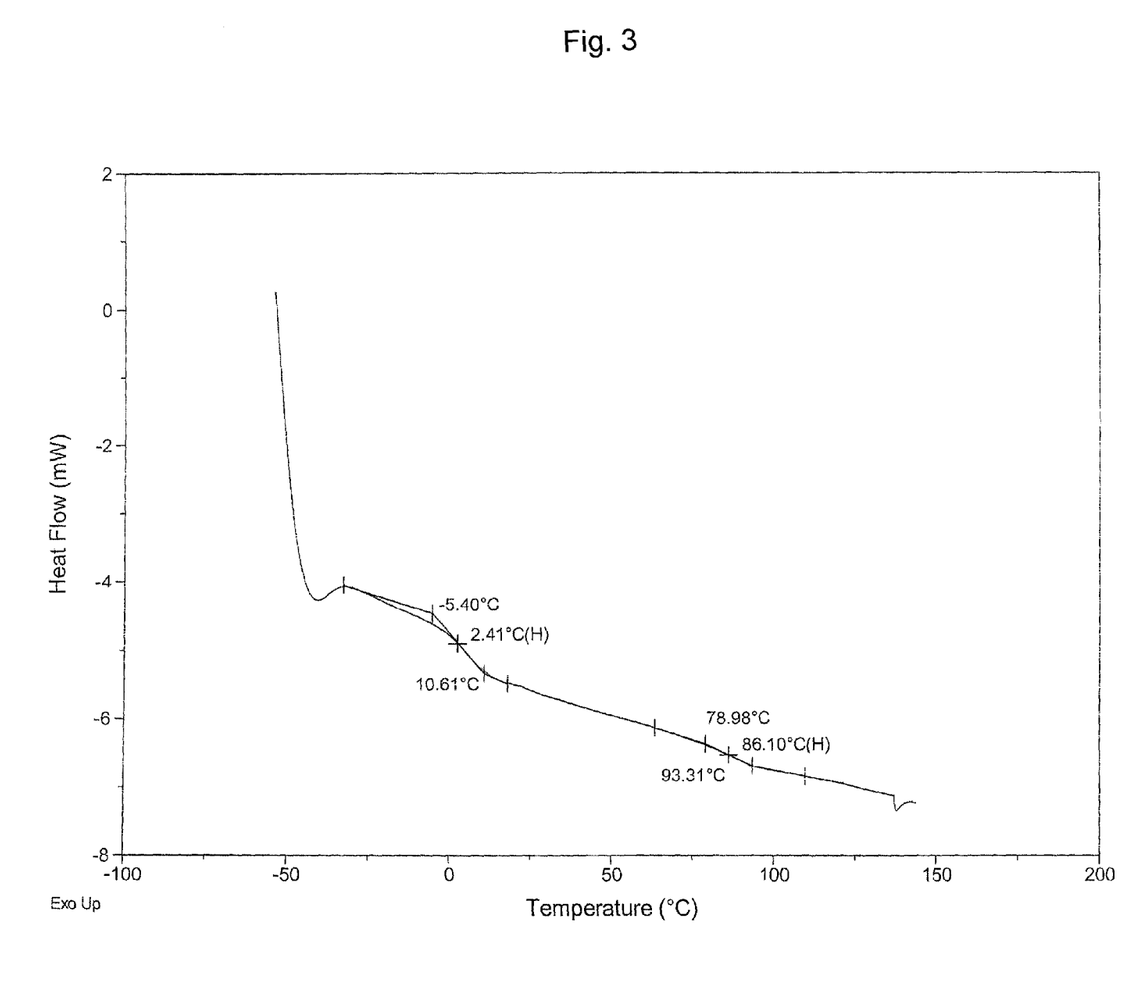

An acetoacetyl functional multistage latex polymer was prepared from a first monomer mixture containing butyl acrylate, methyl methacrylate, butyl methacrylate, AAEM, acrylic acid and methacrylic acid and a second monomer mixture containing butyl acrylate, methyl methacrylate, AAEM, acrylic acid and methacrylic acid. To 100 parts polymer were added five parts AAEM and 0.8 parts γ-glycidoxypropyltriethoxysilane. FIG. 3 shows the DSC curve, and demonstrates that the polymer exhibited two distinct Tg values, namely a soft stage Tg at about 2.4° C. and a hard stage Tg at about 86.1° C. Solids were 40% and the MMFT was less than 10° C.

Example 3

Multistage Acetoacetyl Functional Latex Polymer

Figure 4:
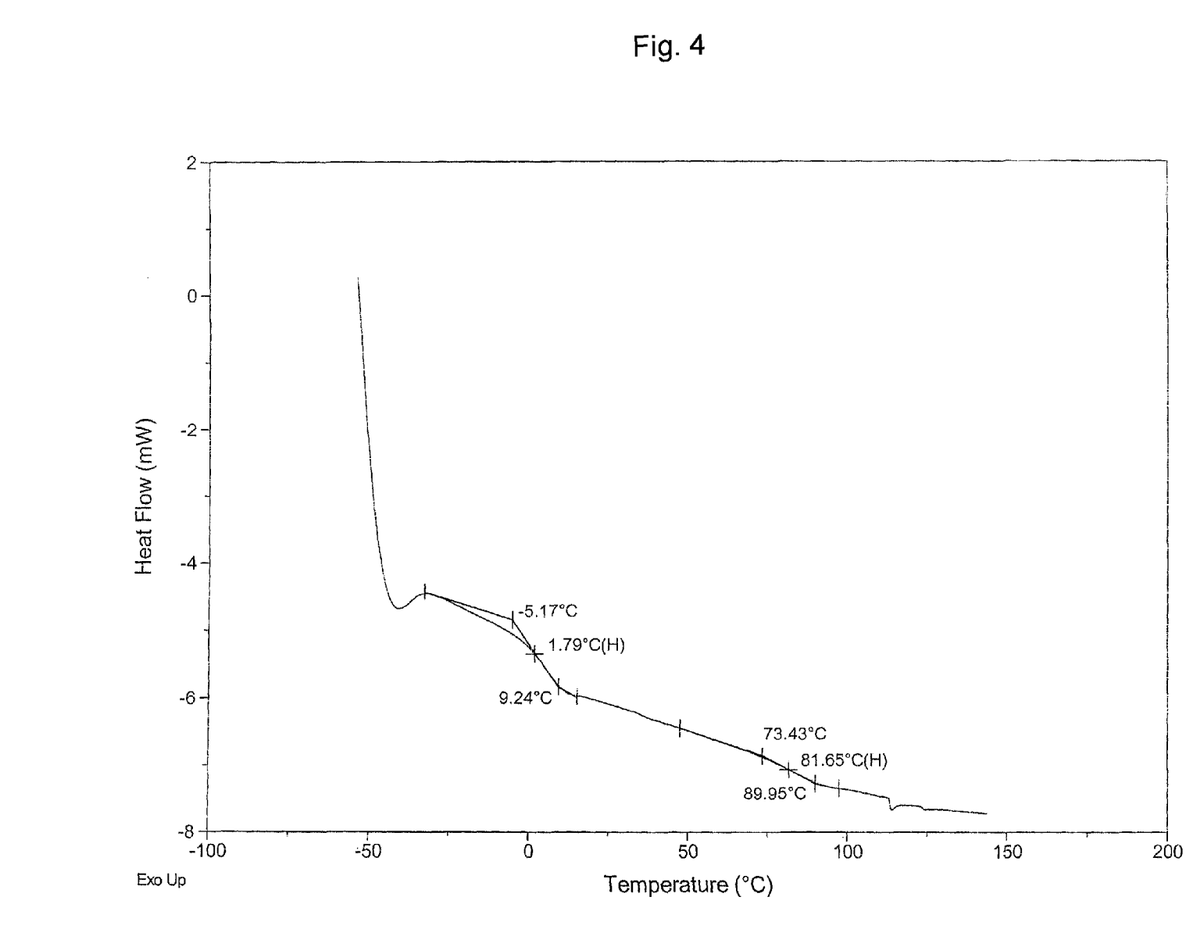

An acetoacetyl functional multistage latex polymer was prepared from a first monomer mixture containing butyl acrylate, styrene, butyl methacrylate, AAEM, acrylic acid, and methacrylic acid and a second monomer mixture containing methyl methacrylate, butyl methacrylate, AAEM, acrylic acid, and methacrylic acid. FIG. 4 shows the DSC curve, and demonstrates that the polymer exhibited two distinct Tg values, namely a soft stage Tg at about 1.8° C. and a hard stage Tg at about 81.7° C. To 100 parts polymer were added five parts AAEM and 0.8 parts γ-glycidoxypropyltriethoxysilane. Solids were 40% and the MMFT was less than 10° C.

Examples 4a-4c

Coating Compositions

A typical coating composition is prepared as follows. In a mixing vessel equipped with a high-speed mixer and mixing blade, the following ingredients, shown in Table 1, are added in order (parts by weight).

TABLE 1

| Ingredient | | Example 4a | Example 4b | Example 4c |
|---|---|---|---|---|
| Water | | 183 | 183 | 183 |
| Example 1 | | 645 | | |
| Example 2 | | | 645 | |
| Example 3 | | | | 645 |
| Surfynol PSA-336 | Air Products | 3 | 3 | 3 |
| Byk 24 | Byk Chemie | 3 | 3 | 3 |
| Texanol | Eastman | 15 | 15 | 15 |
| Ammonium Hydroxide (28%) | Aldrich Chemical | 3 | 3 | 3 |
| Polyphase 678 | Troy | 8 | 8 | 8 |
| Nuosept 485 | ISP | 1.5 | 1.5 | 1.5 |
| Ethylene Glycol | Aldrich Chemical | 9.3 | 9.3 | 9.3 |

The compositions are mixed for about 15 minutes using moderate agitation.

| Formulation Parameters | |
|---|---|
| Weight Solids | 30.5% |
| Volume Solids | 29.7% |
| Weight/Gallon | 8.65 #/gal |
| VOC | 92 g/l |

| Typical Paint Properties | |
|---|---|
| pH | 8.5-9.5 |
| Color | Clear |
| Viscosity (secs. #2 Z) | 12-20 secs |

Typical coatings containing single stage polymers will have hardness results of about 15-20 seconds and average about 5 to 15 oscillations under ASTM test D-4366. In contrast, coatings containing multi stage polymers such as Examples 4a, 4b and 4c will have improved hardness results of about 30 seconds and average about 20 to 25 oscillations under ASTM test D-4366. Typical coatings containing multistage polymers will also have improved early water resistance.

All patents, patent applications and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within the invention.

Having thus described the preferred embodiments of the present invention, those of skill in the art will readily appreciate that the teachings found herein may be applied to yet other embodiments within the scope of the attached claims.

What is claimed is:
1. A coated substrate, comprising:
a cementitious substrate having at least one major surface; and
a coating composition applied to the major surface, the coating composition comprising a mixture of water, a multistage latex polymer having acetoacetoxy functionality, and about 0.25 to about 10 weight % based on the total latex polymer weight of an epoxy-functional silane coupling agent that provides improved resistance to delamination from the substrate when a hardened coating made from the composition is exposed for one hour at 60° C. to 1,034 kPa pressure from an automotive tire tread section heated to 60° C.
2. The substrate of claim 1, wherein the multistage latex polymer comprises at least one soft stage having a Tg between about −65 and 30° C. and at least one hard stage having a Tg between about 30 and 230° C.
3. The substrate of claim 2, wherein the multistage latex polymer comprises 50 to 90 weight % soft stage polymer morphology having a Tg between about −5 and 25° C. and 10 to 50 weight % hard stage polymer morphology having a Tg between about 30 and 105° C., based on total polymer weight.
4. The substrate of claim 1, wherein the multistage latex polymer has a gradient Tg.
5. The substrate of claim 1, wherein the multistage latex polymer was made from 0.5 to 10 weight % acetoacetoxy functional monomer based on the total polymer weight.
6. The substrate of claim 1, wherein the coating composition comprises at least about 10 weight % multistage latex polymer based on total coating composition solids, and about 0.25 to 5 weight % silane coupling agent based on the total latex polymer weight.
7. The substrate of claim 1, wherein the coating composition includes less than 10 weight % volatile organic compounds and at least 1 weight % low VOC coalescent.

8. The composition of claim 1, wherein the composition resists crush when two face-to-face coated embossed substrates are subjected to a pressure of 8 kg/cm².

9. A coated substrate, comprising:
a cementitious substrate having at least one major surface; and
a coating composition applied to the major surface, the coating composition comprising a mixture of water, a latex polymer having acetoacetoxy functionality, and about 0.25 to about 10 weight % based on the total latex polymer weight of an epoxy-functional silane coupling agent that provides improved resistance to delamination from the substrate when a hardened coating made from the composition is exposed for one hour at 60° C. to 1,034 kPa pressure from an automotive tire tread section heated to 60° C.

10. The substrate of claim 8, wherein the latex polymer comprises at least one soft stage having a Tg between about −65 and 30° C. and at least one hard stage having a Tg between about 30 and 230° C.

11. The substrate of claim 8, wherein the latex polymer was made from 0.5 to 10 weight % acetoacetoxy functional monomer based on the total polymer weight.

12. The substrate of claim 8, wherein the coating composition comprises at least about 10 weight % latex polymer based on total coating composition solids, and about 0.25 to 5 weight % silane coupling agent based on the total latex polymer weight.

13. The substrate of claim 8, wherein the coating composition includes less than 10 weight % volatile organic compounds and at least 1 weight % low VOC coalescent.

14. A method for preparing a coated substrate comprising
providing a cementitious substrate;
coating at least a portion of the substrate with a coating composition comprising water, a multistage latex polymer having acetoacetoxy functionality, and about 0.25 to about 10 weight % based on the total latex polymer weight of an epoxy-functional silane coupling agent; and
allowing the coating to harden
wherein the silane coupling agent provides improved resistance to delamination from the substrate when the hardened coating is exposed for one hour at 60° C. to 1,034 kPa pressure from an automotive tire tread section heated to 60° C.

15. A method for preparing a coated substrate comprising
providing a cementitious substrate;
coating at least a portion of the substrate with a coating composition comprising water, a latex polymer having acetoacetoxy functionality, and about 0.25 to about 10 weight % based on the total latex polymer weight of an epoxy-functional silane coupling agent; and
allowing the coating to harden
wherein the silane coupling agent provides improved resistance to delamination from the substrate when the hardened coating is exposed for one hour at 60° C. to 1,034 kPa pressure from an automotive tire tread section heated to 60° C.

* * * * *